(12) United States Patent
Mayer et al.

(10) Patent No.: US 11,988,541 B2
(45) Date of Patent: May 21, 2024

(54) METHOD FOR RADAR MEASUREMENT OF A FILLING LEVEL IN A CONTAINER

(71) Applicant: Endress+Hauser SE+Co. KG, Maulburg (DE)

(72) Inventors: Winfried Mayer, Buch (DE); Manuel Sautermeister, Schopfheim (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 396 days.

(21) Appl. No.: 17/297,491

(22) PCT Filed: Nov. 11, 2019

(86) PCT No.: PCT/EP2019/080797
§ 371 (c)(1),
(2) Date: May 27, 2021

(87) PCT Pub. No.: WO2020/108965
PCT Pub. Date: Jun. 4, 2020

(65) Prior Publication Data
US 2022/0034702 A1    Feb. 3, 2022

(30) Foreign Application Priority Data
Nov. 28, 2018  (DE) ............... 10 2018 130 186.3

(51) Int. Cl.
*G01F 23/284* (2006.01)
*G01S 7/35* (2006.01)
(Continued)

(52) U.S. Cl.
CPC .......... *G01F 23/2845* (2013.01); *G01S 7/354* (2013.01); *G01S 13/34* (2013.01); *G01S 13/88* (2013.01)

(58) Field of Classification Search
None
See application file for complete search history.

(56) References Cited

U.S. PATENT DOCUMENTS 6,995,706 B2 *  2/2006  Ohlsson ................. G01S 13/24
                                                    342/134
7,308,825 B2 * 12/2007  Hagg .................... G01F 23/284
                                                    73/290 R
(Continued)

FOREIGN PATENT DOCUMENTS

CN    101592514 A    12/2009
DE    69327953 T2     8/2000
(Continued)

*Primary Examiner* — Peter J Macchiarolo
*Assistant Examiner* — Jermaine L Jenkins
(74) *Attorney, Agent, or Firm* — Christopher R. Powers; Endress+Hauser (USA) Holding, Inc.

(57) ABSTRACT

A method for radar-based measurement of a filling level of a filling material in a container includes, in successive measurement cycles, generating an evaluation curve, and the relevant current evaluation curve is stored; a first difference curve is formed based on the evaluation curve of the current measurement cycle and a stored evaluation curve of a preceding measurement cycle; and the filling level is determined based on a maximum in the current first difference curve. The filling level is thus established from the difference curve rather than from the evaluation curve, and the filling level can be determined with greater certainty—in particular in the case of filling material having rippled surfaces.

11 Claims, 2 Drawing Sheets

(51) Int. Cl.
  *G01S 13/34* (2006.01)
  *G01S 13/88* (2006.01)

(56) References Cited

U.S. PATENT DOCUMENTS

| | | | |
|---|---|---|---|
| 7,342,531 B2 * | 3/2008 | Hagg | G01F 23/284 |
| | | | 73/290 R |
| 9,581,484 B2 | 2/2017 | Mayer et al. | |
| 2010/0156702 A1 | 6/2010 | Edvardsson | |
| 2014/0028492 A1 | 1/2014 | Mayer et al. | |
| 2015/0033844 A1 * | 2/2015 | Chen | G01S 13/882 |
| | | | 73/290 V |
| 2015/0253177 A1 | 9/2015 | Blodt | |
| 2018/0164145 A1 | 6/2018 | Daufeld et al. | |
| 2020/0209046 A1 * | 7/2020 | Müller | G01F 23/2962 |

FOREIGN PATENT DOCUMENTS

| | | |
|---|---|---|
| DE | 102015120362 A1 | 6/2017 |
| DE | 102015120736 A1 | 6/2017 |
| DE | 102016108594 A1 | 11/2017 |

\* cited by examiner

METHOD FOR RADAR MEASUREMENT OF A FILLING LEVEL IN A CONTAINER

CROSS-REFERENCE TO RELATED APPLICATIONS

The present application is related to and claims the priority benefit of German Patent Application No. 10 2018 130 186.3, filed on Nov. 28, 2018, and International Patent Application No. PCT/EP2019/080797, filed on Nov. 11, 2019, the entire contents of which are incorporated herein by reference.

TECHNICAL FIELD

The invention relates to a method for measuring the filling level of a filling material in a container and to a filling-level measurement device for carrying out this method.

BACKGROUND

In process automation technology, field devices are generally used for capturing or influencing process variables. For this purpose, the functioning of the field devices is in each case based upon suitable measuring principles in order to capture the corresponding process variables, such as filling level, flow rate, pressure, temperature, pH value, redox potential, or conductivity. A wide variety of such field devices is manufactured and distributed by the Endress+Hauser Group.

For measuring the filling level of filling materials in containers, radar-based measuring methods have become established, since they are robust and require minimum maintenance. Within the scope of the invention, the term, "container," also refers to containers that are not closed, such as basins, lakes, or flowing bodies of water. A key advantage of radar-based measuring methods lies in their ability to measure the filling level more or less continuously. In the context of this patent application, the term, "radar," refers to microwave signals with frequencies between 0.03 GHz and 300 GHz. Typical frequency bands in which filling level measurement is carried out are 2 GHz, 6 GHz, 26 GHz, or 79 GHz. The higher the frequency band selected, the narrower the beam cone in which the microwave signal is emitted.

In the case of radar-based filling level measurement, the pulse time-of-flight principle is an established measuring principle. Here, pulse-shaped microwave signals are emitted cyclically in the direction of the filling material, and the time of flight until reception of the corresponding pulse-shaped receive signal is measured. On the basis of this measuring principle, filling-level measuring devices can be determined with comparatively low circuit complexity.

If a more complex circuit technology can be accepted, FMCW (frequency-modulated continuous wave) is a possible measuring principle for radar-based filling level measurement. This measuring principle is based upon the fact that the microwave signal is transmitted continuously, but with a modulated frequency. In this case, the frequency of the microwave signal lies within a defined frequency band in the range of a standardized center frequency. Characteristic of FMCW is here that the transmission frequency is not constant, but changes periodically within the defined frequency band. At a center frequency of 79 GHz, the frequency band is, for example, 2 GHz, i.e., from 78 GHz to 80 GHz. With FMCW as well, the emission or reception of the microwave signals is divided into successive measuring cycles.

In the case of FMCW, the change in frequency over time is linear by default and has a sawtooth or triangular shape. However, a sinusoidal change can, in principle, also be used. In contrast to the pulse time-of-flight method, the distance or the filling level when implementing the FMCW method is determined on the basis of the instantaneous frequency difference between the current receive signal and the just-emitted microwave signal.

The measuring principle of FMCW and the pulse time-of-flight method are described in, for example, "*Radar Level Detection, Peter Devine,* 2000." In both of the measuring principles, in order to determine the filling level on the basis of the receive signal, a corresponding evaluation curve is recorded. In the case of the pulse radar-based method, due to the high pulse frequency, the evaluation curve is generated by undersampling the reflected receive signal. As a result, the evaluation curve represents the actual reflected receive signal in a time-expanded way. When implementing the FMCW method, the evaluation curve is generated by mixing the just-transmitted microwave signal with the reflected receive signal. Here as well, the evaluation curve is expanded in its time axis through the mixing. Regardless of the measuring principle, the evaluation curve again mirrors the amplitude of the reflected receive signal as a function of the measuring distance. In both FMCW and pulse time-of-flight methods, the evaluation curve is created with complex values, depending upon the type of circuit structure of the signal processing.

The filling level is determined from the evaluation curve by detection and local assignment of the corresponding local maximum. In the ideal case, there is no further maximum besides the maximum that is generated by the filling material surface. However, the containers in which the filling level is to be determined become increasingly complex as the degree of automation of systems increases. In addition to the filling material, they may contain, for example, internal components such as filling nozzles, agitators, heating rods, or cleaning devices. In addition, there is a tendency towards smaller production batches, and thus smaller containers. This creates the risk that, in addition to the filling level maximum in the evaluation curve, further maxima appear at corresponding locations on the evaluation curve which could be incorrectly interpreted as a filling level maximum by the filling-level measurement device.

It is therefore essential for a reliable filling level measurement in complex and small containers that only the filling material, and not the container walls or container internal components, be detected by the beam cone of the microwave signal. Filling-level measurement devices which operate in high-frequency bands are therefore preferred, so that the microwave signal is emitted with a high degree of beam focusing.

As a result, depending upon the installation situation, the filling-level measurement device can emit the microwave signal in such a way that interfering internal components or the container wall are not irradiated. If the filling-material surface moves due to boiling, stirring, sloshing, or the like, however, the small illumination spot on the surface of the filling material resulting from the high degree of beam focusing will be disadvantageous. In the case of wave-like movements or sloshing, a large part of the reflected microwave signal will be deflected and thereby no longer return to the antenna of the filling-level measurement device. The amplitude of the filling level maximum in the corresponding evaluation curve therefore drops so sharply at times that the filling level can no longer be determined. If this happens too frequently, any algorithms for signal tracking will also fail and the filling level maximum be lost as measuring cycles progress. This usually leads to a total failure of filling level measurement.

SUMMARY

The aim of the invention is therefore to provide a filling-level measurement device by means of which the filling level can be determined more reliably.

The invention achieves this aim by a method for radar-based measurement of a filling level of a filling material in a container. The method comprises the following method steps, which are repeated in successive measuring cycles:
- emitting a microwave signal in the direction of the filling material,
- receiving a receive signal after reflection of the microwave signal inside the container,
- generating an evaluation curve on the basis of at least the receive signal,
- progressively storing the respective current evaluation curve,
- forming a first difference curve on the basis of the evaluation curve of the current measuring cycle and a stored evaluation curve of a preceding measuring cycle, and
- determining the filling level on the basis of a maximum in the current, first difference curve.

Since the filling level according to the invention is determined, if necessary, not from the evaluation curve, but from the difference curve, the filling level can also be determined with high certainty in the case of moving filling material surfaces. In combination with the conventional determination of the filling level, the filling level can thereby be determined more reliably overall.

With the aid of the difference curve, the filling level can be determined particularly reliably in the case of moving filling-material surfaces if the evaluation curves are each created having complex values. In this case, the difference curve can, accordingly, also be created to have complex values, i.e., to consist of real part and imaginary part. The filling level can thus be determined on the basis of a maximum in the imaginary part or in the real part of the current, first difference curve.

If the measuring cycles in which the filling level in each case is newly determined are repeated at a defined measuring rate, it is advantageous with regard to the method according to the invention if a first distance of the current measuring cycle to the preceding measuring cycle, from which the stored evaluation curve is used to form the first difference curve, is set, in particular, to be inversely proportionally as a function of the measuring rate. By this coupling of the distance to the measurement rate, the elapsed time since the previous measuring cycle, from which the stored evaluation curve is used to form the first difference curve, can be kept constant, even in the case of changing measuring rates. The term, "distance," in this context refers to the number of measuring cycles between the current measuring cycle and the preceding measuring cycle, from which the stored evaluation curve is used for difference curve formation. Instead, however, the first difference curve can also be formed merely on the basis of the current evaluation curve and of the evaluation curve which was created in the directly preceding measuring cycle.

If the measuring cycles are repeated at a defined measuring rate, it can additionally be implemented that a second difference curve is generated, analogously to the first difference curve. In the case of the second difference curve, a second distance of the current measuring cycle to that preceding measuring cycle, from which the stored evaluation curve is used to form the second difference curve, will be set. Here, the second distance is selected to differ from the first distance of the current measuring cycle to the preceding measuring cycle, from which the stored evaluation curve is used to form the first difference curve. Two difference curves are thus created, in which two stored evaluation curves are used, each of which relates to a different time in the past. How far apart the first distance from the second distance is selected to be can in turn be made individually dependent upon the respective situation in the container. This offers, among other things, the advantage that the filling level can be determined on the basis of the second difference curve, provided the filling level cannot be determined on the basis of the first difference curve, or vice versa. Alternatively, the filling level can also be determined on the basis of that difference curve whose maximum has a greater amplitude.

Alternatively or in addition to determining the filling level on the basis of the difference curve, the filling level can be determined on the basis of the current evaluation curve. This is particularly advantageous if the filling level cannot be determined on the basis of the first difference curve and/or on the basis of the second difference curve i.e., if the filling material surface is not moving, for example.

Analogously to the method according to the invention in one of the aforementioned embodiments, the aim upon which the invention is based is achieved by a corresponding radar-based filling-level measurement device. In order to carry out the method according to at least one of the preceding embodiment variants, it accordingly comprises the following components:
- a signal-generation unit designed to emit a microwave signal in the direction of the filling material in each case in successive measurement cycles,
- a receiving unit designed to receive the corresponding receive signal after reflection of the microwave signal inside the container,
- an evaluation unit designed to
  - generate, per measuring cycle, an evaluation curve on the basis of at least the receive signal,
  - progressively store the respective current evaluation curve,
  - form a first difference curve by subtracting the evaluation curve of the current measuring cycle and the evaluation curve of a preceding measuring cycle, and
  - determine the filling level on the basis of first difference curve.

With reference to the filling-level measurement device, the term, "unit," within the framework of the invention, is understood in principle to mean any electronic circuit which is suitably designed for the respective intended purpose. Depending upon the requirement, it can therefore be an analog circuit for generating or processing corresponding analog signals. However, it can also be a digital circuit such as a microcontroller or a storage medium operating in conjunction with a program. In this case, the program is designed to carry out the corresponding method steps or to apply the necessary calculation operations of the respective unit. In this context, various electronic units of the filling-level measurement device in the sense of the invention can potentially also access a common physical memory or be operated by means of the same physical digital circuit.

The method according to the invention is particularly advantageous when the evaluation unit of the filling-level measurement device is designed to produce the evaluation curve and the difference curve with complex values, as is the case, by default, with FMCW. In this case, the real part and the imaginary part of the evaluation curves are subtracted separately from each other. This allows any differences between the evaluation curves to be detected more clearly. This in turn makes it easier to determine a possible maximum, and thus the corresponding filling level, from the current difference curve. Accordingly, it is advantageous if the signal-generation unit, the receiving unit, and the evaluation unit are designed to determine the filling level on the basis of the FMCW principle.

Since the method according to the invention has an advantageous effect especially in the case of moving filling-material surfaces, the method will, due to the narrow beam cone at high frequencies, be particularly effective if the signal-generation unit is designed to emit the microwave signal in a frequency band of at least 60 GHz, or if the receiving unit and the evaluation unit are designed to process the corresponding receive signal.

BRIEF DESCRIPTION OF THE DRAWINGS

The invention is explained in more detail with reference to the following figures. Shown are.

DETAILED DESCRIPTION

Figure 1:
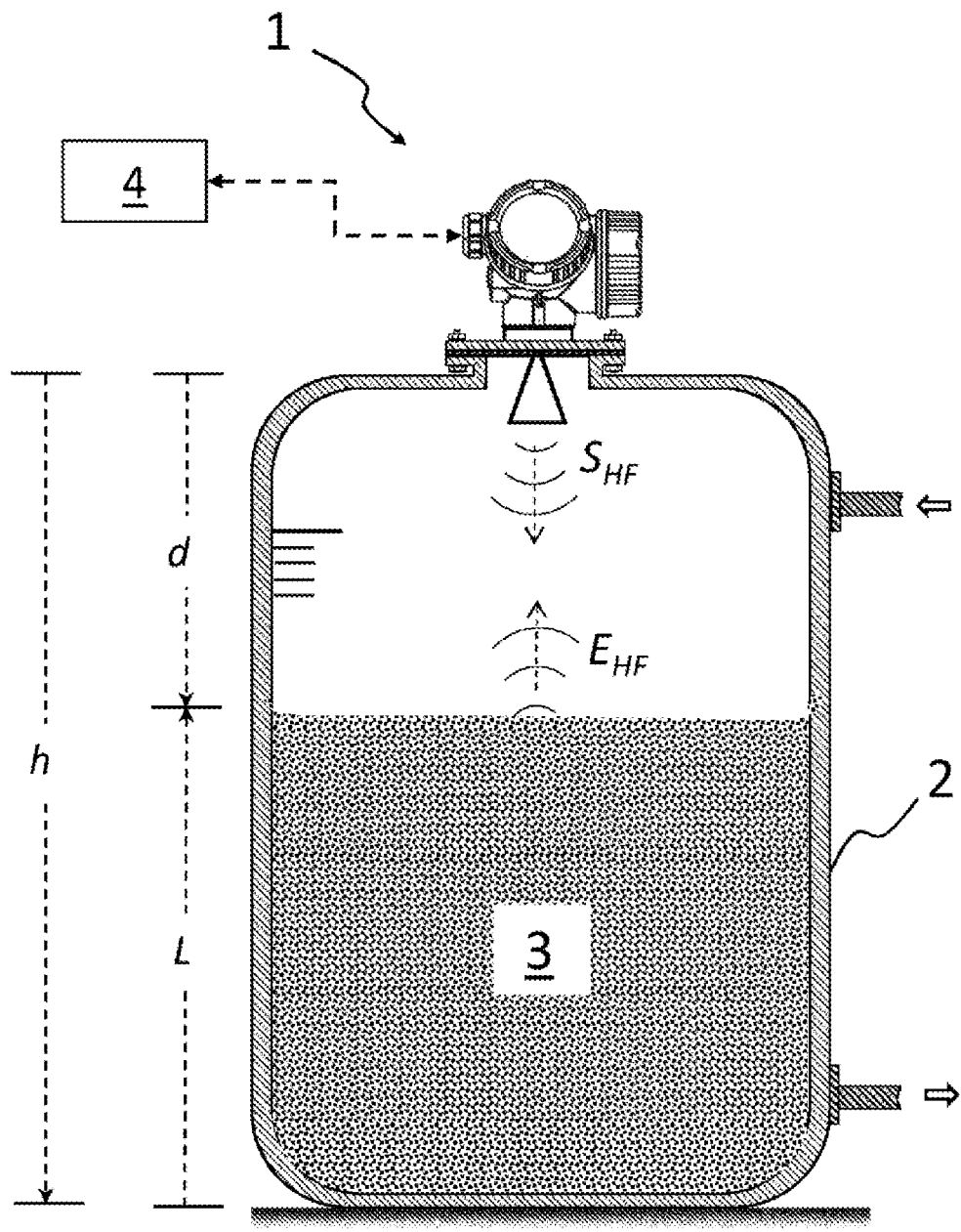
FIG. 1 shows a typical arrangement of a radar-based filling-level measurement device.

For a basic understanding of the invention, FIG. 1 shows a typical arrangement of a freely-radiating, radar-based filling-level measurement device 1 on a container 2. In the container 2 is a filling material 3, whose filling level L is to be determined by the filling-level measurement device 1. For this purpose, the filling-level measurement device 1 is mounted on the container 2 above the maximum permissible filling level L. Depending upon the field of application, the installation height h of the filling-level measurement device 1 above the container bottom can be more than 100 m.

As a rule, the filling-level measurement device 1 is connected via a bus system, such as "Ethernet," "PROFIBUS," "HART," or "Wireless HART," to a higher-level unit 4, such as a process control system or a decentralized database. On the one hand, information about the operating status of the filling-level measurement device 1 can thus be communicated. However, information about the filling level L can also be transmitted via the bus system, in order to control any inflows or outflows that may be present at the container 2.

Since the filling-level measurement device 1 shown in FIG. 1 is designed as freely-radiating radar, it comprises a corresponding antenna. As indicated, the antenna can be designed as a horn antenna, for example. Especially in the case of radar frequencies above 100 GHz, the antenna can also be realized as a planar antenna. Regardless of the design, the antenna is oriented in such a way that corresponding microwave signals $S_{HF}$ are emitted in the direction of the filling material 3. In doing so, the microwave signals $S_{HF}$ are generated, depending upon the measuring method (pulse time-of-flight or FMCVV), in a corresponding signal-generation unit of the filling-level measurement device 1.

The microwave signals $S_{HF}$ are reflected at the surface of the filling material 3 and, after a corresponding signal propagation time, are received as receive signals $E_{HF}$ by the antenna or a downstream receiving unit of the filling-level measurement device 1. The filling level L can be determined from the receive signals $E_{HF}$ because the signal propagation time of the microwave signals $S_{HF}$, $E_{HF}$ depends upon the distance d=h−L of the filling-level measurement device 1 to the filling-material surface.

To determine the filling level L, an evaluation unit of the filling-level measurement device 1 designed for this purpose creates an evaluation curve $ZF_{n-1}$, $ZF_n$ for each measuring cycle n on the basis of the receive signal $E_{HF}$. In this case, the evaluation curve $ZF_{n-1}$, $ZF_n$ reproduces the amplitude A (or, in the case of complex-value recording, also, indirectly, the phase) of the reflected receive signal as a function of the measuring distance d or the signal propagation time of the transmit signal $S_{HF}$/receive signal $E_{HF}$.

When implementing the FMCW method, the evaluation unit of the filling-level measurement device 1 generates the evaluation curve $ZF_{n-1}$, $ZF_n$ in principle by mixing the just received receive signal $E_{HF}$ with the currently emitted microwave signal $S_{HF}$, wherein the microwave signal $S_{HF}$ is transmitted continuously for this purpose with a sawtooth-shaped frequency change.

In the case of the pulse time-of-flight method, the evaluation curve $ZF_{n-1}$, $ZF_n$ is generated by undersampling the pulse-shaped receive signal $E_{HF}$. The pulse frequency of the sampling signal in the sub-per mil range deviates from the pulse frequency of the microwave signal $S_{HF}$ or of the receive signal $E_{HF}$.

In the case of both FMCW and the pulse time-of-flight method, the evaluation curve $ZF_{n-1}$, $ZF_n$ represents the signal amplitude A of the receive signal $E_{HF}$ as a function of the measuring distance d. In the case of freely-radiating, radar-based filling level measurement, the corresponding measurement range h accordingly extends from the antenna of the filling-level measurement device 1 to the bottom of the container 2. Schematic evaluation curves $ZF_{n-1}$, $ZF_n$ are shown in FIG. 2.

According to the prior art, the evaluation unit of the filling-level measurement device 1 determines the filling level L from the evaluation curve $ZF_{n-1}$, $ZF_n$. For this purpose, the location d of the maximum $A_m$ of the filling material surface is determined.

Due to the higher degree of focusing of the emitted microwave signal $S_{HF}$ and the potentially higher resolution of the measured filling level L, the highest possible radar frequencies at above 60 GHz are used, particularly when implementing the FMCW method. However, it is precisely in the case of sloshing filling materials 3 that a narrow beam cone can lead to the microwave signal $S_{HF}$ being deflected upon reflection at the filling material surface, so that the receive signal $E_{HF}$ is not received by the antenna of the filling-level measurement device 1. In such cases, the evaluation curve $ZF_n$, as shown in FIG. 2, does not have a maximum $A_m$ in the corresponding measuring cycle n−1.

Figure 2:
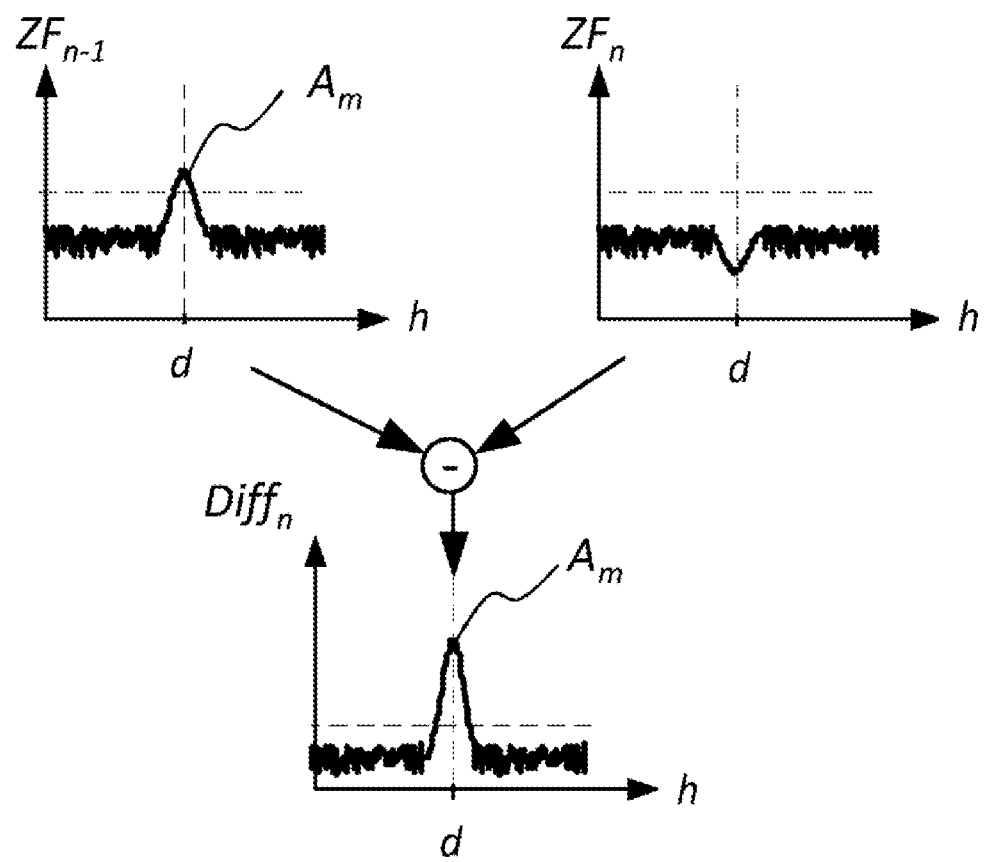
FIG. 2 shows a schematic representation of the method according to the present disclosure.

The method according to the invention, with which the filling level L can also be reliably determined under such circumstances, is therefore illustrated in more detail by FIG. 2. The method is based upon subtracting the evaluation curve $ZF_n$ of the current measuring cycle n from a stored evaluation curve $ZF_{n-m}$ of a preceding measuring cycle n-m (in the simplest case, the immediately preceding measuring cycle n−1) to create a first difference curve $\text{Diff}_n$. Within the meaning of the invention, it is not of decisive importance which evaluation curve $ZF_{n-m1}$, $ZF_{n-1}$ is subtracted from the other curve. The filling-level measurement device 1 determines the filling level L on the basis of this first difference curve $Diff_n$, according to the invention. To search for the maximum $A_m$ (or the minimum, depending upon how the difference is formed) in difference curve $Diff_n$, any algorithm suitable for this can be implemented in the evaluation unit.

As can be seen from FIG. 2, the method has the advantage that the maximum $A_m$ of the filling-material surface appears in the first difference curve $Diff_n$, even when the evaluation curve $ZF_n$ of the current measuring cycle n does not have a maximum $A_m$, for example, due to sloshing of the filling material 3. The benefit is therefore that the maximum $A_m$ is contained in the evaluation curve $ZF_{n-1}$ of the preceding measuring cycle n−1. Peripheral maxima in the evaluation curves $ZF_n$, $ZF_{n-m}$, which are caused by static internal components in the container 3 (for reasons of clarity, not shown in FIG. 2), are, however, masked by the method according to the invention, so that these maxima cannot lead to an erroneous determination of the filling level L.

With the method according to the invention, the filling level L can be determined very reliably, particularly when the filling-level measurement device 1 produces the evaluation curve $ZF_n$ and the difference curve $Diff_n$ with complex values.

Due to the fact that, in this case, even subtraction takes place with complex values (that is, the real parts or the imaginary parts of the evaluation curves $ZF_n$ and $ZF_{n-m}$ are subtracted separately from each other), any changes between the evaluation curves $ZF_n$ and $ZF_{n-m}$ can be recorded with even higher resolution. In the exemplary embodiment shown in FIG. 2, the graphs show the imaginary part of the evaluation curves $ZF_n$, $ZF_{n-1}$ and, accordingly, the imaginary part of the difference curve $Diff_n$. As a result of the complex-valued analysis of the evaluation curves $ZF_n$, $ZF_{n-1}$, the filling level can appear as a minimum, as is the case in the current evaluation curve $ZF_n$.

In addition to the filling-level measurement device 1 having sufficient computing power and storage capacity, it is necessary for complex-valued recording of the difference curve $Diff_n$ that the signal-generation unit and the evaluation unit be clocked coherently.

Above all, if, in past measuring cycles n-m, the filling level maximum $A_m$ appears continuously at the same point or with the same amplitude in the evaluation curve $ZF_n$, $ZF_{n-m}$, it may happen that the filling level L cannot be determined from the difference curve $Diff_n$. In this respect, it is advantageous if the filling-level measurement device 1 is designed to determine the filling level L from the current evaluation curve $ZF_n$, at least in these cases.

For a reliable implementation of the method according to the invention, it may be advantageous, in addition to the current evaluation curve $ZF_n$, to use in each case not only the evaluation curve $ZF_{n-1}$ of the immediately preceding measuring cycle n−1, in order to form the difference curve $Diff_n$ of the current measuring cycle n. Depending upon the type of disturbance at the filling material surface, or its frequency of occurrence, it is advantageous to set a greater distance m of the current measuring cycle n to the measuring cycle n-m from which the stored evaluation curve $ZF_{n-m}$ is used, in order to form the respective current difference curve $Diff_n$.

In this case, it is advantageous to adapt this distance m to the rate or frequency of the disturbance, taking into account the measuring rate r at which the filling-level measurement device 1 repeats the measuring cycles n. The sloshing of the filling material 3 can, in the process, be caused, for example, by an agitator which is operated at a defined frequency. If, then, the disturbance occurs at an approximate frequency of 1 Hz, and the measuring rate r is only 10 Hz, as is customary with a limited energy supply of the filling-level measurement device 1 by means of a 4-20 mA signal, the respective distance must be set to m=10 measuring cycles. Accordingly, if the filling-level measurement device 1 changes the measuring rate r during operation, it makes sense to adjust the distance m between the measuring cycles m, m-n to be inversely proportionally as a function of the measuring rate r.

Within the scope of the invention, the filling-level measurement device 1 can, for purposes of redundancy, be further developed in such a way that, in addition to the first difference curve $Diff_n$, it also records a second difference curve $Diff2_n$. The underlying distance l of the current measuring cycle n to the measuring cycle n-l, from which the stored evaluation curve $ZF_{n-1}$ is used to form the difference curve, deviates from the corresponding first distance m of the first difference curve $Diff_n$. The deviation of the two distances l, m can here be set, for example, with a fixed value of 10 measuring cycles. In this further development of the filling-level measurement device 1, the redundancy can, for example, be checked by determining the filling level L from both difference curves $Diff_n$, $Diff2_n$ separately. There is redundancy if the filling level value L of both measurements matches.

The invention claimed is:

1. A method for radar-based measurement of a filling level of a filling material in a container, the method comprising the following steps, which are repeated in successive measuring cycles:
   emitting a microwave signal in a direction of the filling material via an antenna;
   receiving a receive signal generated after reflection of the microwave signal inside the container via the antenna;
   generating a current evaluation curve with complex values based on at least the receive signal;
   progressively storing the current evaluation curve in each measuring cycle;
   calculating a first difference curve with complex values based on the current evaluation curve of a current measuring cycle and a stored evaluation curve of a preceding measuring cycle; and
   determining the filling level based on a maximum of the imaginary part or of the real part of the current, first difference curve.

2. The method of claim 1, wherein the measuring cycles in which the filling level is in each case re-determined are repeated at a defined measuring rate.

3. The method of claim 2, wherein a first distance of the current measuring cycle to the preceding measuring cycle, from which the stored evaluation curve is used to calculate the first difference curve, is set to be inversely proportionally as a function of the measuring rate.

4. The method of claim 1, wherein the first difference curve is calculated based on the current evaluation curve and of the evaluation curve created in the immediately preceding measuring cycle.

5. The method of claim 1, wherein, analogously to the first difference curve, a second difference curve is created, and wherein a second distance of the current measuring cycle to the preceding measuring cycle is selected, from which the stored evaluation curve is used to calculate the second difference curve, deviating from the first distance of the current measuring cycle to the preceding measuring cycle, from which the stored evaluation curve is used to calculate the first difference curve.

6. The method of claim 5, wherein, the filling level cannot be determined based on the first difference curve, the filling level is determined based on the second difference curve.

7. The method of claim 5, wherein the filling level is determined from the difference curve whose maximum has a greater amplitude.

8. The method of claim 1, wherein, when the filling level cannot be determined based on the first difference curve and/or based on the second difference curve, the filling level is determined based on the current evaluation curve.

9. A radar-based filling-level measurement device for determining a filling level of a filling material in a container, the device comprising:
  a signal-generation unit configured to emit a microwave signal via an antenna in a direction of the filling material in each case in successive measuring cycles;
  a receiving unit configured to receive via the antenna a corresponding receive signal generated after reflection of the microwave signal inside the container;
  an evaluation unit configured to:
    generate an evaluation curve with complex values in each measuring cycle based on at least the receive signal;
    progressively store the respective current evaluation curve;
    calculate a first difference curve with complex values by subtracting the evaluation curve of the current measuring cycle and the evaluation curve of a preceding measuring cycle; and
    determine the filling level based on a maximum of the imaginary part or of the real part of the current, the first difference curve.

10. The device of claim 9, wherein the signal-generation unit, the receiving unit, and the evaluation unit are configured to determine the filling level based on the FMCW principle.

11. The device of claim 9, wherein the signal-generation unit is configured to emit the microwave signal in a frequency band of at least 60 GHz, and wherein the receiving unit and the evaluation unit are configured to process the corresponding receive signal.

* * * * *